US005769201A

United States Patent [19]

Dwight et al.

[11] Patent Number: 5,769,201

[45] Date of Patent: Jun. 23, 1998

[54] SAFETY APPARATUS FOR A NOVICE SKI LIFT

[75] Inventors: Barton R. Dwight, Denver; John S. Horn, Granby, both of Colo.

[73] Assignee: Silver Creek Holding Co., Inc., Silver Creek, Colo.

[21] Appl. No.: 574,819

[22] Filed: Dec. 19, 1995

[51] Int. Cl.[6] .................... B65G 43/00

[52] U.S. Cl. .................... 198/323; 198/322; 198/325

[58] Field of Search .................... 198/322, 323, 198/324, 325, 571, 572, 577; 104/173.2, 178

[56] References Cited

U.S. PATENT DOCUMENTS

| | | | |
|---|---|---|---|
| 3,298,495 | 1/1967 | Acton | 198/325 |
| 3,687,257 | 8/1972 | Johnson | 198/325 |
| 3,853,212 | 12/1974 | Downes | 198/572 |

*Primary Examiner*—Joseph E. Valenza
*Assistant Examiner*—Khoi H. Tran
*Attorney, Agent, or Firm*—Klaas, Law, O'Meara & Malkin, P.C.; Joseph J. Kelly

[57] ABSTRACT

Safety apparatus for use at the exit portion of a moving conveyor, such as that used by novice skiers, wherein at least one plate is pivotally mounted adjacent to the exit portion and is resiliently urged to an upper position so that when a sufficient force is applied to the plate, the plate moves and the pivotal movement actuates a control switch to stop the conveyor. The exit end of the plate has a plurality of spaced apart teeth located in arcuate grooves in the arcuate front surface of an egress platform so that the arcuate pivotal movement of the teeth is concentric to the arcuate grooves and arcuate front surface. A roller may be located between the plate and the exit portion of the moving conveyor.

18 Claims, 3 Drawing Sheets

SAFETY APPARATUS FOR A NOVICE SKI LIFT

This invention relates generally to safety apparatus for conveyors used to transport people and more specifically to safety apparatus for conveyors used to transport novice skiers.

BACKGROUND OF THE INVENTION

One of the types of apparatuses used to transport novice skiers from a lower location to an upper location comprises an inclined conveyor belt. At the upper location, the conveyor belt moves generally in a horizontal plane. As the novice skiers exit from the horizontal portion of the conveyor belt, there is a possibility of falling. Therefore, it is desirable to provide some type of safety apparatus at this location. At one location, safety apparatus is provided and comprises a slidable plate that moves generally in a horizontal plane. One disadvantage of this safety apparatus is that once the plate moves, a cavity is formed between the end portion of the conveyor belt and the edge of the plate to present a hazard. Therefore, there exists a need for safety apparatus to protect the novice skiers.

BRIEF DESCRIPTION OF THE INVENTION

This invention provides safety apparatus located at the exit portion of a moving conveyor belt wherein at least a portion of the safety apparatus is mounted for pivotal movement relative to the conveyor belt when a sufficient force is applied thereto.

In one embodiment of the invention, the safety apparatus comprises a moving conveyor comprising a conveyor belt journaled around a drive roll and an idler roll and having an entrance portion and an exit portion. Safety means are located adjacent to the exit portion. Pivot means are provided for pivotally mounting at least a portion of the safety means. Upper and lower stop means are provided for limiting the pivotal movement of at least a portion of the safety means. Force applying means are provided for urging the at least a portion of the safety means against the upper stop means until a sufficient force is applied to the at least a portion of the safety means to overcome the force applying means and pivotally move the at least portion of the safety means. Control means are provided for stopping the moving conveyor and are activated by the pivotal movement of the at least a portion of the safety means. The pivot means comprise a frame having opposite side portions mounted at a fixed location. At least two spaced apart mounting plates are pivotally mounted by pivot means on each of the opposite side portions. Support means extend between and are secured to the mounting plates for movement therewith and the support means comprise at least one plate. The axis of rotation of the at least one plate is off set from the axis of rotation of the one of the drive roll or idler roll located at said exit portion so that the at least one plate moves slightly away from the conveyor belt during its pivotal movement. The safety apparatus further comprises a rotatable roller extended between and mounted on the mounting plates for movement therewith. The at least one plate has an entrance portion and an exit portion with the roller being located between the entrance portion and the at least one plate and the exit portion of the moving conveyor. Drive means are provided for rotating the roller. The roller has a plurality of spaced apart circumferentially extending recesses formed therein. The entrance portion of the at least one plate has a plurality of spaced apart teeth located so that the end portions of the teeth are located in the recesses. The exit portion of the at least one plate is located in a horizontal plane and the entrance portion of the at least one plate is located in a plane inclined downwardly from the horizontal plane of the exit portion of the at least one plate.

The at least one plate has an entrance portion and an exit portion and the exit portion has an end portion comprising a plurality of spaced apart teeth. An egress platform is located adjacent to the exit portion of the at least one plate. The egress platform has a generally planar upper surface and arcuate front surface having a plurality of spaced apart grooves formed therein. Each of the grooves has an arcuate surface so that the the teeth of the exit portion may be located in the grooves during the pivotal movement of the at least one plate. The arcuate surface of each of the grooves has a radius of curvature that is substantially the same as the pivotal radius of the end of each of the teeth of the exit portion of the at least one plate.

In another preferred embodiment of the invention the rotatable roller and the drive means therefore are eliminated. The at least one plate has a linearly extending front edge portion. The exit portion of the at least one plate has an upper surface lying generally in the same horizontal plane of the exit portion of the conveyor belt. The entrance portion of the at least one plate has an upper surface inclined downwardly from the upper surface of the exit portion of the at least one plate so that the linearly extending front edge portion is adjacent to a portion of the conveyor belt. The exit portion of the at least one plate and the egress platform are constructed as described above.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
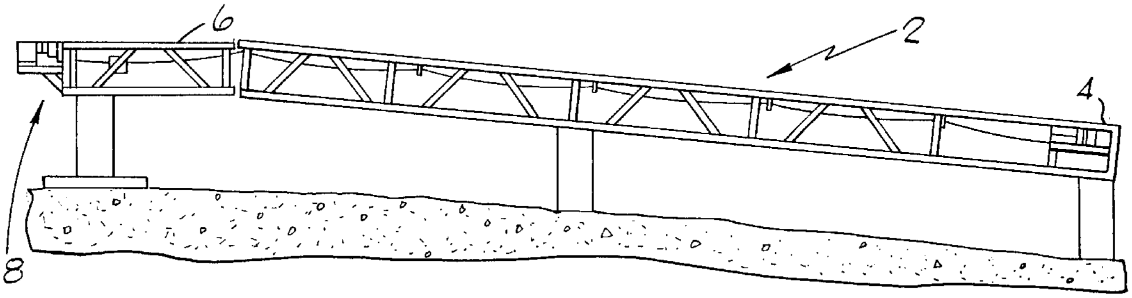
FIG. 1 is a side elevational view of a conventional novice ski conveyor.

In FIG. 1, there is illustrated a conventional novice ski conveyor 2 having an entrance portion 4 and an exit portion 6 which lies generally in a horizontal plane. The safety apparatus 8 of this invention is mounted after the exit portion 6. Although not illustrated, when the novice ski conveyor is in use, the areas surrounding the novice ski conveyor are filled with snow and are at the levels of the conveyor 2 and the safety apparatus 8.

Figure 2:
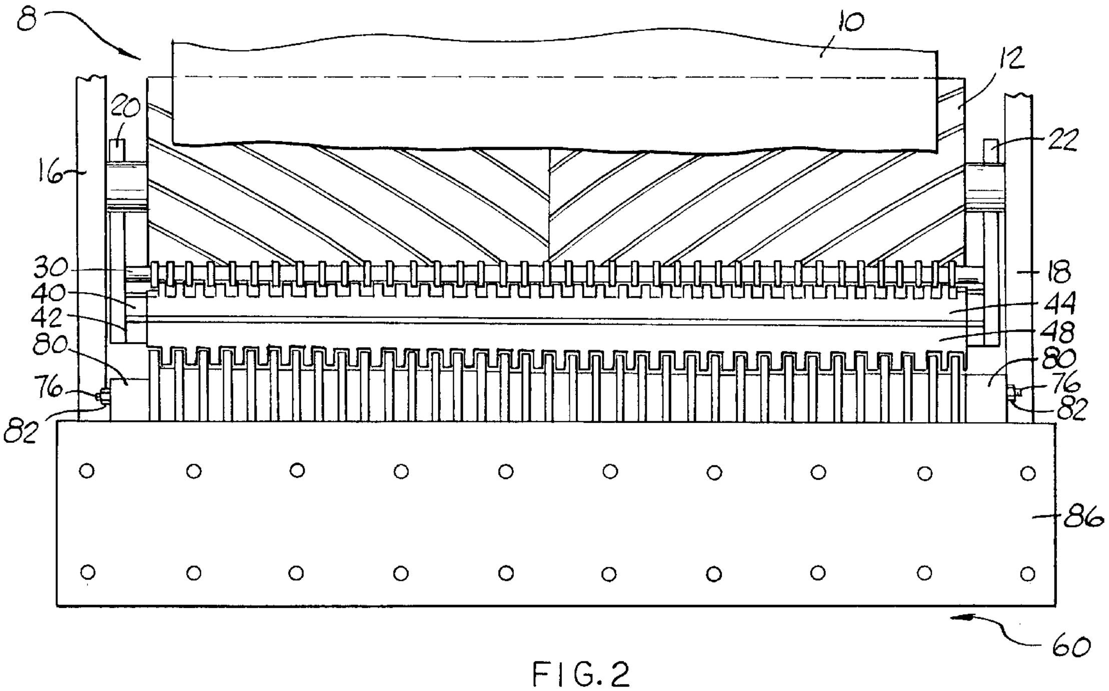
FIG. 2 is a top plan view of a portion of the safety apparatus of one preferred embodiment of this invention.
Figure 11:
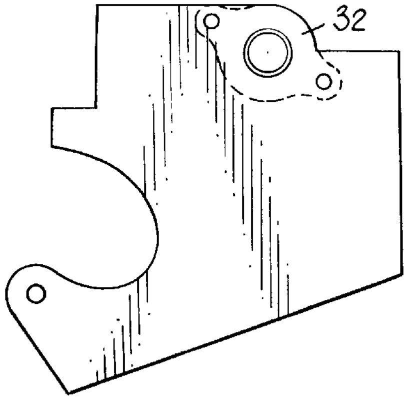
FIG. 11 is an elevational view of a mounting plate of this invention.

A portion of the safety apparatus 8 of this invention is illustrated in FIG. 2. A conveyor belt 10 is journaled over a drive roll 12 which is mounted by conventional means on a support frame 14, FIG. 3, having opposite side portions 16 and 18. A mounting plate 20, FIG. 11, is pivotally mounted on the side portion 16 and a similar mounting plate 22 is pivotally mounted on the side portion 18 by pivot means 24.

Figure 9:
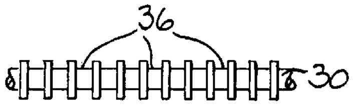
FIG. 9 is a front elevational view of a portion of the roller of this invention.

A roller 30 is rotatably mounted on bearing blocks 32 mounted on the mounting plates 20 and 22 and is rotated by convential drive means 34 driven by the drive roll 12. The roller 30 is provided with a plurality of spaced apart circumferentially extending grooves 36, FIG. 9, for a purpose described below.

Support beams 40 and 42, FIGS. 1 and 3–5, extend between and are secured to the mounting plates 20 and 22 for movement therewith. A support plate 44 is mounted on the support beam 40 and is either formed from a material having a low coefficient of friction or has its upper surface coated with such a material. The support plate 44 has a plurality of outwardly projecting spaced apart teeth 46 for a purpose described below. A support plate 48 is mounted on the support beam 42 and is either formed from a material having a low coefficient of friction or has its upper surface coated with such a material. The support plate 48 has a plurality of outwardly extending spaced apart teeth 50 for a purpose described below.

Figure 6:
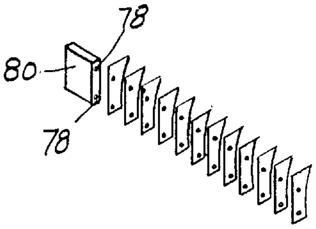
FIG. 6 is a perspective view of a plurality of plates used to form a portion of the egress platform of this invention.
Figure 7:
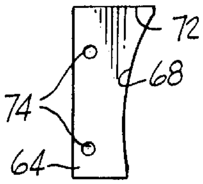
FIG. 7 is an elevational view of one size of the plates in FIG. 6.
Figure 8:
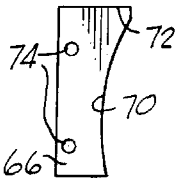
FIG. 8 is an elevational view of a different size of the plates of FIG. 6.

An egress platform 60 is mounted on the support frame 14. The egress platform has a front portion 62 comprising a plurality of plates 64 and 66, FIGS. 6–8. Each plate 64 has an arcuate surface 68 having a radius of curvature as described below. Each plate 66 has an arcuate surface 70 having a radius of curvature as described below. Each of the plates 64 and 66 is formed from a material having a low coefficient of friction or has its upper surface 72 coated with such a material. Each of the plates 64 and 66 has spaced apart openings 74 so that rods 76, FIG. 1, having threaded end portions may be passed through openings in support blocks 80 secured on the side portions 16 and 18 and secured using nuts 82. The egress platform 60 has support means 84 for supporting an egress plate 86 which is either formed from a material having a low coefficient of friction or has its upper surface 88 formed from such a material.

Figure 3:
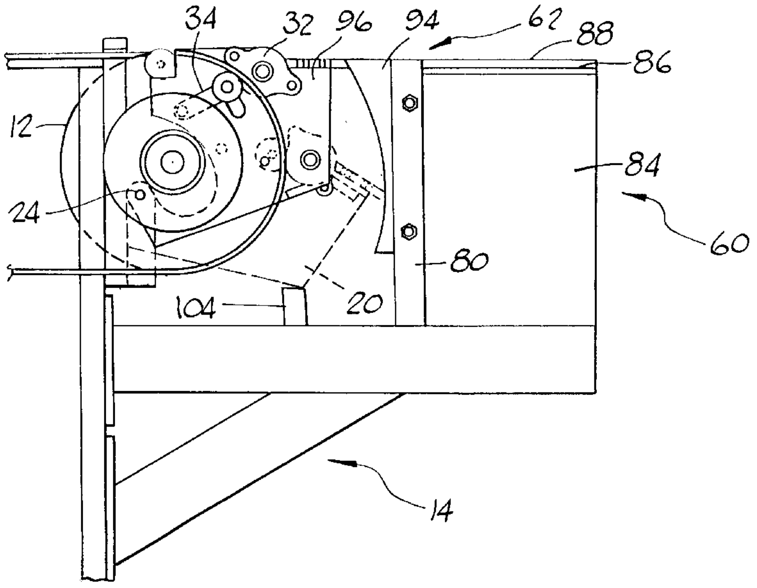
FIG. 3 is an end elevational view of the one preferred embodiment of the invention.
Figure 4:
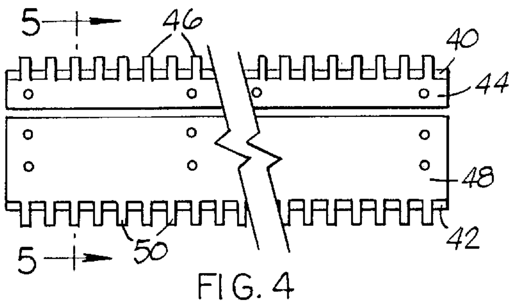
FIG. 4 is a top plan view of a support plate of this invention.
Figure 5:
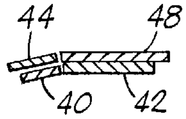
FIG. 5 is a cross-sectional view taken on the line 5—5 of FIG. 4.
Figure 10:
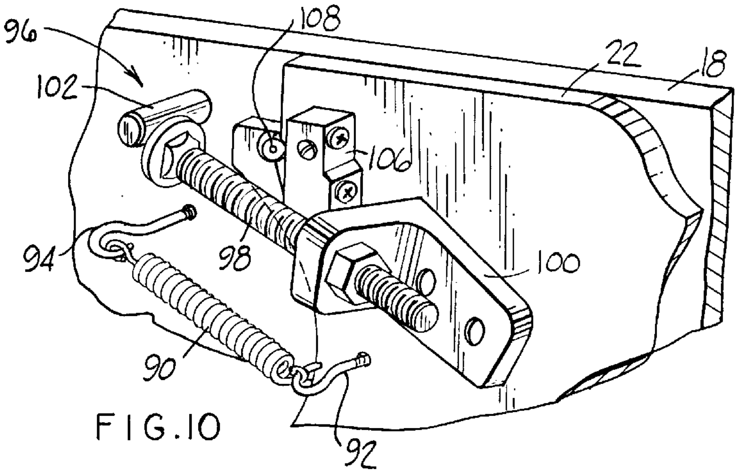
FIG. 10 is a perspective view of another portion of the safety apparatus.

In FIG. 10, there is illustrated resilient means comprising a spring 90 mounted on a support 92 mounted on the mounting plate 22 and a support 94 mounted on the side portion 18. The spring 80 functions to hold the mounting plates 20 and 22 in the upper position 96 illustrated by the solid lines in FIG. 3. Stop means 96 comprising a threaded bolt 98 mounted in a threaded opening in the angle bracket 100 are secured to the mounting plate 22 and an abutment pin 102 mounted on the side portion 18 are provided to stop the upward pivotal movement of the mounting plates 20 and 22. The downward pivotal movement of the mounting plates 20 and 22 is limited by the contact of the mounting plates 20 and 22 with the abutment blocks 104 as illustrated in FIG. 3. Control means comprising an electrical box 106 on the mounting plate 22 and contact means 108 on the side portion 18 are provided. When the mounting plate 22 is in the position illustrated in FIG. 10, the electrical box 106 and the contact means 108 permit the motor (not shown) to operate to move the conveyor belt 10. When the electrical box 106 moves with the mounting plate 22, as explained below, the electrical box 106 is separated from the contact means 108 to stop the operation of the motor and stop the movement of the conveyor belt 10.

Under normal operating conditions, the conveyor belt 10 will be moving and the spring 90 will hold the mounting plates 20 and 22 against the abutment pins 102 so that the support plates 44 and 48 and the roller 30 will be in the upper position 96. If something happens so that a force greater than the force applied by the spring 90 is placed on the support plates 44 and 48, the mounting plates 20 and 22 will pivot and move downwardly until the mounting plates 20 and 22 contact the abutment blocks 104. The radius of curvature of the arcuate surfaces 68 are designed to accommodate the pivotal movement of the support beam 42 and the arcuate surfaces 70 are designed to accommodate the pivotal movement of the teeth 50. The grooves 36 are designed to accommodate the fingers 46 and the outer surfaces of the roller 30 and the support beam 40 are designed to be in a close but spaced apart relationship. The pivot axis of the mounting plates 20 and 22 is offset from the rotational axis of the drive roll 12 so that when the mounting plates 20 and 22 are pivoted, the space between the outer surface of the roller 30 and the portion of the conveyor belt 10 around the drive roll 12 is slightly increased.

Figure 12:
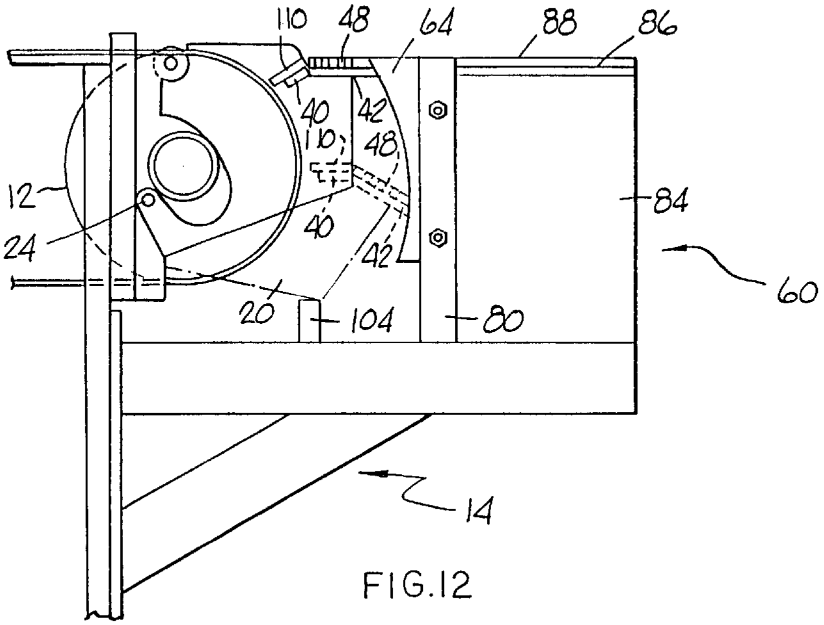
FIG. 12 is an end elevational view of another preferred embodiment of this invention.
Figure 13:
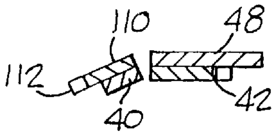
FIG. 13 is a cross-sectional view similar to FIG. 5.
Figure 14:
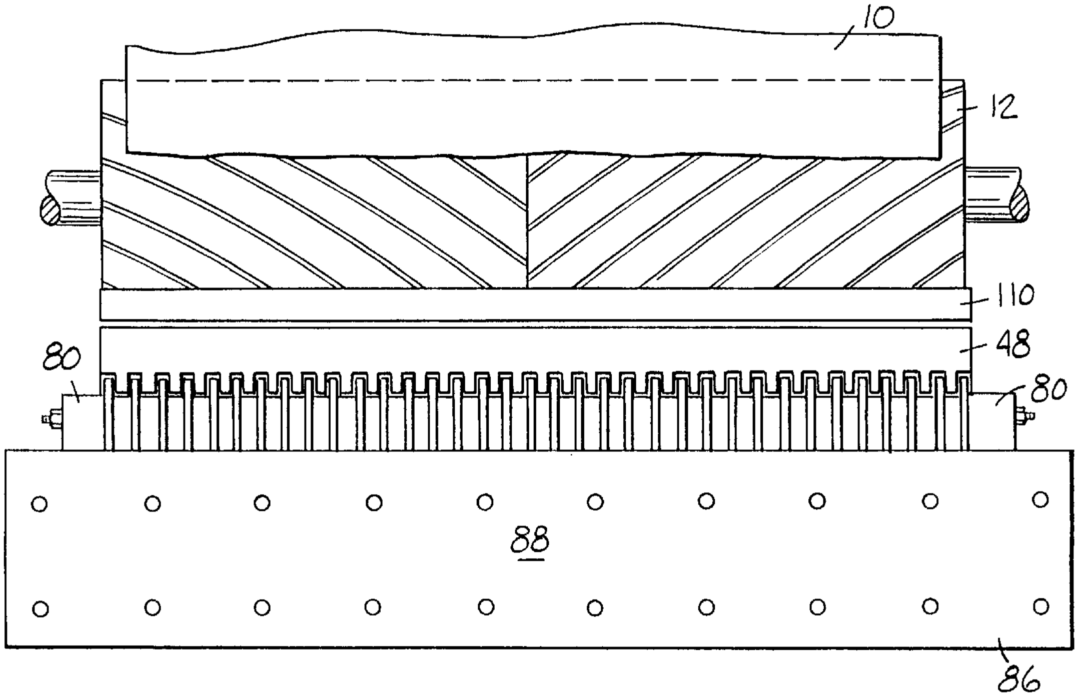
FIG. 14 is a top plan view of a portion of FIG. 12.

Another preferred embodiment of the invention is illustrated in FIGS. 12–14 wherein the roller 30 and the drive means 34 have been eliminated and the support plate 44 has been modified. Parts in FIGS. 12–14 corresponding to parts in FIGS. 1–11 have been identified with the same reference numerals. A support plate 110 is mounted on the support beam 40 and has a linear front edge 112 that is located in close proximity to the portion of the conveyor belt 10 around the drive roll 12. The operation of the safety apparatus illustrated in FIGS. 12–14 is the same as the operation of the safety apparatus illustrated in FIGS. 1–11.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Safety apparatus incorporated in a moving conveyor comprising a conveyor belt journaled around at least a two spaced apart rolls, each having an axis of rotation and having an entrance portion and an exit portion and used to transport people from one location to another location comprising:

safety means located adjacent to said exit portion;

pivot means for pivotally mounting at least a portion of said safety means;

upper and lower stop means for limiting the pivotal movement of said at least a portion of said safety means;

force applying means for urging said at least a portion of said safety means against said upper stop means until a sufficient force is applied to said at least a portion of said safety means to overcome said force applying means and pivotally move said at least a portion of said safety means;

control means for stopping said moving conveyor being actuated by said pivotal movement of said at least a portion of said safety means;

a frame having opposite side portions mounted at a fixed location;

at least two spaced apart mounting plates;

pivot means on each of said opposite side portions for pivotally mounting said mounting plates for movement around an axis of rotation;

support means extending between and secured to said mounting plates for movement therewith; and said support means comprising at least one plate.

2. Safety apparatus as in claim 1 wherein:

said axis of rotation of said at least one plate being off set from said axis of rotation of the one of said at least two spaced apart rolls located at said exit portion so that said at least one plate moves slightly away from said conveyor belt during its pivotal movement.

3. Safety apparatus as in claim 1 and further comprising:

a roller extending between and mounted on said mounting plates for movement therewith;

said roller being rotatably mounted on said mounting plates for rotation relative thereto;

said at least one plate having an entrance portion and an exit portion;

said roller being located between said entrance portion of said at least one plate and said exit portion of said moving conveyor; and drive means for rotating said roller.

4. Safety apparatus as in claim 3 wherein:

said exit portion of said conveyor belt having an upper portion located in a horizontal plane; and said roller being located so that the upper portion thereof is located in said horizontal plane.

5. Safety apparatus as in claim 4 and further comprising:

said roller having a plurality of spaced apart circumferentially extending recesses formed therein;

said entrance portion of said at least one plate having a plurality of spaced apart teeth having end portions; and said at least one plate being located so that said end portions of said teeth are located in said recesses.

6. Safety apparatus as in claim 5 wherein:

said exit portion of said at least one plate being located in a horizontal plane; and said entrance portion of said at least one plate being located in a plane inclined downwardly from said horizontal plane of said exit portion of said at least one plate.

7. Safety apparatus as in claim 1 and further comprising:

said at least one plate having an entrance portion and an exit portion;

said exit portion having an end portion comprising a plurality of spaced apart teeth;

an egress platform located adjacent to said exit portion of said at least one plate;

said egress platform having a generally planar upper surface;

said egress platform having an arcuate front surface with a plurality of spaced apart grooves formed therein; and each of said grooves having an arcuate surface so that said teeth of said exit portion of said at least one plate may be located in said grooves during said pivotal movement of said at least one plate.

8. Safety apparatus as in claim 7 wherein:

said arcuate surface of each of said grooves having a radius of curvature that permits the pivotal movement of said end portions of each of said teeth of said exit portion of said at least one plate.

9. Safety apparatus as in claim 8 and further comprising:

a roller extending between and secured to said mounting plates for movement therewith:

said roller being rotatably mounted in said mounting plates; and said roller being located between said entrance portion of said at least one plate and said exit portion of said moving conveyor.

10. Safety apparatus as in claim 9 wherein:

said exit portion of said conveyor belt having an upper portion located in a horizontal plane; and said roller being located so that the upper portion thereof is substantially located in said horizontal plane.

11. Safety apparatus as in claim 10 and further comprising:

said roller having a plurality of spaced apart circumferentially extending recesses formed therein;

said entrance portion of said at least one plate having a plurality of spaced apart teeth having end portions; and said at least one plate being located so that said end portions of said teeth are located in said recesses.

12. Safety apparatus as in claim 11 wherein:

said exit portion of said at least one plate being located in a horizontal plane; and said entrance portion of said at least one plate being located in a plane incline downwardly from said horizontal plate of said exit portion of said at least one plate.

13. Safety apparatus as in 7 wherein:

said entrance portion of said at least one plate having a linearly extending front surface.

14. Safety apparatus as in claim 13 and further comprising:

said axis of rotation of said at least one plate being off set from said axis of rotation of the one of said at least two spaced apart rolls located at said exit portion.

15. Safety apparatus as in claim 14 wherein:

said at least one plate moves away from said conveyor belt during its pivotal movement.

16. Safety apparatus as in claim 13 wherein:

said arcuate surface of each of said grooves having a radius of curvature that permits the pivotal movement of said end portions of each of said teeth of said exit portion of said at least one plate.

17. Safety apparatus as in claim 13 wherein:

said exit portion of said conveyor belt having an upper surface located in a horizontal plane;

said exit portion of said at least one plate having an upper surface substantially located in said horizontal plane; and said entrance portion of said at least one plate having an upper surface inclined downwardly from said upper surface of said exit portion of said at least a plate.

18. Safety apparatus as in claim 17 wherein:

said linearly extending front surface being located adjacent to said conveyor belt at said exit portion.

* * * * *